United States Patent
Kim et al.

(10) Patent No.: US 10,331,322 B2
(45) Date of Patent: Jun. 25, 2019

(54) METHOD AND SYSTEM FOR PROTOTYPING GRAPHIC USER INTERFACE

(71) Applicant: STUDIO XID KOREA, INC., Seoul (KR)

(72) Inventors: Soo Kim, Hwaseong-si (KR); Jae Won Song, Seoul (KR)

(73) Assignee: STUDIO XID KOREA, INC., Seoul (KR)

(*) Notice: Subject to any disclaimer, the term of this patent is extended or adjusted under 35 U.S.C. 154(b) by 0 days.

(21) Appl. No.: 15/381,043

(22) Filed: Dec. 15, 2016

(65) Prior Publication Data

US 2017/0192658 A1    Jul. 6, 2017

(30) Foreign Application Priority Data

Jan. 6, 2016   (KR) .................... 10-2016-0001334

(51) Int. Cl.
   *G06F 3/0484*    (2013.01)
   *G06F 3/0482*    (2013.01)
   *G06F 3/0488*    (2013.01)

(52) U.S. Cl.
   CPC ........ *G06F 3/04847* (2013.01); *G06F 3/0482* (2013.01); *G06F 3/0488* (2013.01); *G06F 3/04845* (2013.01)

(58) Field of Classification Search
   CPC . G06F 3/04847; G06F 3/0482; G06F 3/04845
   See application file for complete search history.

(56) References Cited

U.S. PATENT DOCUMENTS

| | | | | |
|---|---|---|---|---|
| 7,533,368 | B1* | 5/2009 | Ford | G06F 9/542 |
| | | | | 707/999.1 |
| 9,672,281 | B1* | 6/2017 | Kapoor | G06F 17/30507 |
| 2007/0179641 | A1* | 8/2007 | Lucas | G05B 19/0426 |
| | | | | 700/83 |
| 2012/0054095 | A1* | 3/2012 | Lesandro | G06Q 20/10 |
| | | | | 705/39 |

(Continued)

FOREIGN PATENT DOCUMENTS

| JP | S59-060641 A | 4/1984 |
|---|---|---|
| JP | H07-334355 A | 12/1995 |

(Continued)

OTHER PUBLICATIONS

Korean Notice of Allowance dated Jun. 29, 2016 corresponding to Korean Application No. 10-2016-0001334.

(Continued)

*Primary Examiner* — Shourjo Dasgupta
(74) *Attorney, Agent, or Firm* — Studebaker & Brackett PC

(57) ABSTRACT

Disclosed are methods and systems for prototyping graphic user interface, the methods includes at least: receiving, by a prototyping terminal, a first chain reaction rule through a prototyping interface, sensing, by a prototype execution terminal, a change in a value of a reference attribute of a trigger object within a trigger range of the first chain reaction rule, and changing, by the prototype execution terminal, a display state of a reaction object according to a change rule of the first chain reaction rule when sensing the change in the value of the reference attribute of the trigger object.

18 Claims, 10 Drawing Sheets

(56) References Cited

U.S. PATENT DOCUMENTS

| | | | |
|---|---|---|---|
| 2014/0033087 A1* | 1/2014 | Jaramillo | G06F 8/38 |
| | | | 715/764 |
| 2014/0068470 A1 | 3/2014 | Divita et al. | |
| 2014/0207840 A1* | 7/2014 | Smith | H04N 21/8193 |
| | | | 709/201 |
| 2014/0263678 A1* | 9/2014 | Schnell | F24F 11/006 |
| | | | 236/47 |
| 2015/0026573 A1* | 1/2015 | Meng | G06F 17/3089 |
| | | | 715/716 |
| 2015/0149966 A1 | 5/2015 | Abraham et al. | |
| 2016/0123118 A1* | 5/2016 | Downton | E21B 7/00 |
| | | | 703/7 |
| 2017/0148200 A1* | 5/2017 | Shoulson | G06T 13/40 |

FOREIGN PATENT DOCUMENTS

| | | |
|---|---|---|
| JP | H11-066339 A | 3/1999 |
| JP | 2010-33500 A | 2/2010 |
| KR | 10-2015-0092880 A | 8/2015 |
| WO | 2012/140564 A1 | 10/2012 |

OTHER PUBLICATIONS

An Office Action mailed by the Japanese Patent Office dated Jul. 31, 2018, which corresponds to Japanese Patent Application No. 2017-563902 and is related to U.S. Appl. No. 15/381,043.

* cited by examiner

METHOD AND SYSTEM FOR PROTOTYPING GRAPHIC USER INTERFACE

This application claims the benefit of Korean Patent Application No. 10-2016-0001334 filed on Jan. 6, 2016, in the Korean Intellectual Property Office, the disclosure of which is incorporated herein by reference in its entirety.

BACKGROUND

1. Field

The present inventive concept relates to a method and system for prototyping a graphic user interface (GUI), and more particularly, to a method and system for prototyping a user interface that can be applied to a terminal.

2. Description of the Related Art

Terminal manufacturers are putting a great deal of effort into the design of graphic user interfaces (GUIs) in order to increase user convenience. The design of GUIs is becoming more important not only to terminal manufacturers but also to service providers that provide services through applications.

In the process of designing a GUI, various tools are used to make a prototype of the GUI. GUI manufacturers can identify user convenience and various graphic effects through a built prototype of a GUI even before applying the user interface to terminals or services.

In a GUI manufacturing environment using prototyping tools, a change in the display state of each object on a GUI should be defined for each user input method. That is, a change in the display state of one object on a GUI is not used as a trigger input for changing the display state of another object. Accordingly, GUI manufacturers have to separately define attributes and changes of all objects on a GUI in order to build a prototype.

SUMMARY

Aspects of the present disclosure provide a prototyping method and apparatus which can change the display state of an object in response to a change in the display state of another object regardless of a user input method.

Aspects of the present disclosure also provide a method and apparatus which enable a user to easily prototype a graphic user interface (GUI).

Aspects of the present disclosure also provide a method and apparatus which can simplify a prototyping process because there is no need to define conditions for changing a display state for each object.

Aspects of the present disclosure also provide a method and apparatus which can minimize the amount of computation of an applied terminal by reducing the amount of information required for the implementation of a GUI.

Aspects of the present disclosure also provide a method and apparatus which can nonlinearly change the display state of an object in response to a change in the display state of another object.

However, aspects of the present disclosure are not restricted to the one set forth herein. The above and other aspects of the inventive concept will become more apparent to one of ordinary skill in the art to which the inventive concept pertains by referencing the detailed description of the inventive concept given below.

According to some embodiments of the present disclosure, a method for prototyping a graphic user interface by a prototyping system is provided, the method comprises receiving, by a prototyping terminal, a first chain reaction rule through a prototyping interface, sensing, by a prototype execution terminal, a change in a value of a reference attribute of a trigger object within a trigger range of the first chain reaction rule, and changing, by the prototype execution terminal, a display state of a reaction object according to a change rule of the first chain reaction rule when sensing the change in the value of the reference attribute of the trigger object.

According to some embodiments of the present disclosure, a prototyping terminal is provided, the prototyping terminal comprises one or more processors, a memory which loads a computer program executed by the processors, a storage which stores a prototype generated by the execution of the computer program, and a display which displays a prototyping interface, wherein the computer program comprises an operation of receiving a selection of a trigger object and a reference attribute of the trigger object through the prototyping interface, an operation of receiving a trigger range which comprises a start value and an end value of the reference attribute, an operation of receiving, through the prototyping interface, an input for setting a change in a value of the reference attribute of the trigger object as a trigger for changing a display state of a reaction object, and an operation of receiving a selection of the reaction object and a change rule of the reaction object through the prototyping interface.

According to some embodiments of the present disclosure, a computer program coupled to a computing device to execute a method for prototyping a GUI by a prototyping system and stored in a non-transitory computer readable recording medium is provided, the program being configured to execute an operation of receiving a selection of a trigger object and a reference attribute of the trigger object through a prototyping interface, an operation of receiving a trigger range which comprises a start value and an end value of the reference attribute, an operation of receiving, through the prototyping interface, an input for setting a change in a value of the reference attribute of the trigger object as a trigger for changing a display state of a reaction object, and an operation of receiving a selection of the reaction object and a change rule of the reaction object through the prototyping interface.

According to some embodiments of the present disclosure, a system for prototyping a GUI is provided, the system comprises a prototyping terminal which receives a first chain reaction rule through a prototyping interface, and a prototype execution terminal which changes a display state of a reaction object according to a change rule of the first chain reaction rule when sensing a change in a value of a reference attribute of a trigger object within a trigger range of the first chain reaction rule.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
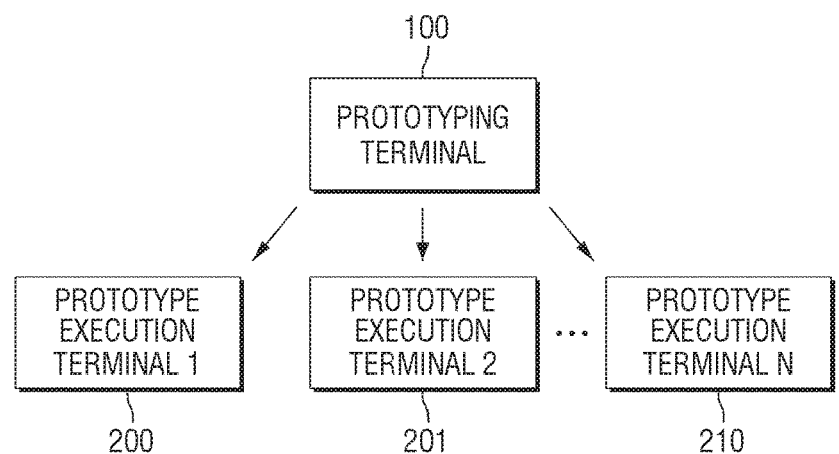
FIG. 1 illustrates the configuration of a system for prototyping a graphic user interface (GUI), which is referred to in some embodiments.

Advantages and features of the present disclosure and methods of accomplishing the same is understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like components throughout the specification.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

An object, as used herein, refers to an object that can be displayed on a prototyping terminal or a prototype execution terminal. It is an object that forms a graphic user interface (GUI) or an object included in the GUI. For example, the object may be a page that forms a GUI or may be an image, a moving image, a graphic design element, etc. included in the GUI.

A reference attribute, as used herein, refers to a display attribute of an object based on which a display attribute of another object is changed. The reference attribute may include a display element such as coordinates, size, color, opacity, etc. of an object. That is, the reference attribute denotes a display element of an object which will be changed in response to a specific input. For example, a reference attribute of object A may be an x-axis coordinate of object A in a prototype of a specific graphic interface. In addition, object A may be set to move along the x-axis in response to a user's swipe touch input in the prototype of the specific graphic interface. In this case, if the user's swipe touch is input to a prototyping terminal or a prototype execution terminal, object A may be moved along the x-axis. Here, since the x-axis coordinate of object A is changed, the reference attribute of object A is also changed. In addition, if the value of the x-axis coordinate of object A is changed according to the movement of object A, the change may be understood as a change in the value of the reference attribute of object A. In the present specification, a change in the value of a reference attribute of an object may also be expressed as a change in the display state of the object.

In the above example, a user's swipe touch input has been described as an example of an input for changing the value of a reference attribute of an object. However, according to an embodiment, the value of the reference attribute of the object can also be changed by a trigger input.

A trigger, as used herein, refers to a change in the value of a reference attribute of an object which causes the display state of another object to change. For example, as object A moves, the value of a reference attribute of object A is changed. In this case, if the display state of object B is changed, for example, if object B moves, the change in the value of the reference attribute of object A is a trigger for changing the display state of object B. The trigger has a trigger range.

A change rule of an object, as used herein, refers to a rule for changing the display state of the object. For example, the change rule of the object may be a rule that makes the object move from a first position to a second position in a predetermined direction along a straight path or a curved path. In this case, according to the change rule, the object may move from the first position to the second position in the predetermined direction along the straight path or the curved path on a display of a terminal. Accordingly, the value of a reference attribute of the object may be changed by the amount of displacement of the object due to the rectilinear or curvilinear movement. Here, the movement of the object from the first position to the second position can also be referred to as a change in the display state of the object from a first state to a second state.

In another example, the change rule of the object may be a rule for changing the opacity of the object. In this case, according to the change rule, the opacity of the object may be changed from first opacity to second opacity on the display of the terminal. Accordingly, the value of the reference attribute of the object may be changed by a difference between the value of the first opacity and the value of the second opacity. Here, a change in the opacity of the object from the first opacity to the second opacity can also be referred to as a change in the display state of the object from the first state to the second state.

The change rule may also include a plurality of change rules. For example, if rectilinear movement and opacity change are set as the change rule of the object, the object may be moved along a straight path, and the opacity of the object may be changed.

A chain reaction rule, as used herein, refers to user settings for the relationship between a trigger object and a reaction object. That is, the chain reaction rule is a rule that defines what graphic effect should be generated by a reaction object when a trigger object moves to what degree in what range. The chain reaction rule is determined as user settings about which object will be selected as a trigger object, what values the reference attribute and trigger range of the selected trigger object will have, which object will be selected as a reaction object whose display state is changed according to a change in the value of the reference attribute of the trigger object within the trigger range, and which change rule will be applied to change the display state of the reaction object.

Hereinafter, the present disclosure is described in greater detail with reference to the attached drawings.

FIG. 1 illustrates the configuration of a system for prototyping a GUI, which is referred to in some embodiments. The configuration and operation of the system for prototyping a GUI will hereinafter be described in detail.

For ease of description, the system for prototyping a GUI will be referred to as a 'system.' Referring to FIG. 1, the system may include a GUI prototyping terminal 100 and a prototype execution terminal 200. In particular, the system may include a plurality of prototype execution terminals (200, 201 and 210). As examples of the prototype execution terminals, prototype execution terminal 1 200, prototype execution terminal 2 201, and prototype execution terminal N 210 are illustrated in FIG. 1. Hereinafter, the GUI prototyping terminal 100 will be referred to as the prototyping terminal 100 for short, and prototype execution terminal 1 200 will be referred to as the execution terminal 200.

The prototyping terminal 100 and the execution terminal 200 are computing devices which can be connected to each other through a network.

According to an embodiment, the prototyping terminal 100 may be a computing device for executing a method of prototyping a GUI according to an embodiment.

In this case, the prototyping terminal 100 may store a program for executing the method of prototyping a GUI. A user of the prototyping terminal 100 may execute the program on the prototyping terminal 100, and the prototyping terminal 100 may provide the user with an interface for prototyping a GUI. When a prototype of a GUI is made by the user, the prototyping terminal 100 may distribute the prototype to a plurality of execution terminals 200, 201 and 210.

Alternatively, according to an embodiment, the prototyping terminal 100 may be a computing device which allows access by the execution terminal 200 and provides a prototype provision service so that a prototype of a GUI can be executed on the execution terminal 200.

In this case, the prototyping terminal 100 may store, in advance, a program for executing a prototype generated according to the method of prototyping a GUI. The execution terminal 200 may download the program from the prototyping terminal 100. Using the program, a user of the execution terminal 200 may execute a prototype of a GUI generated by the prototyping terminal 100 on the execution terminal 200.

According to an embodiment, the prototyping terminal 100 may provide an interface for prototyping a GUI on the web to the execution terminal 200 through the Internet. In this case, the execution terminal 200 may access the prototyping terminal 100 through the Internet and execute a prototyping program on the web.

Each of the prototyping terminal 100 and the execution terminal 200 may be any one of a fixed computing device such as a sever device or a desktop PC and a mobile computing device such as a notebook computer, a smartphone or a tablet PC. In addition to these components, the system may include other components needed to implement embodiments of the inventive concept. For example, the system may further include a relay server which relays the above program between the prototyping terminal 100 and the execution terminal, a push server, etc.

Figure 2:
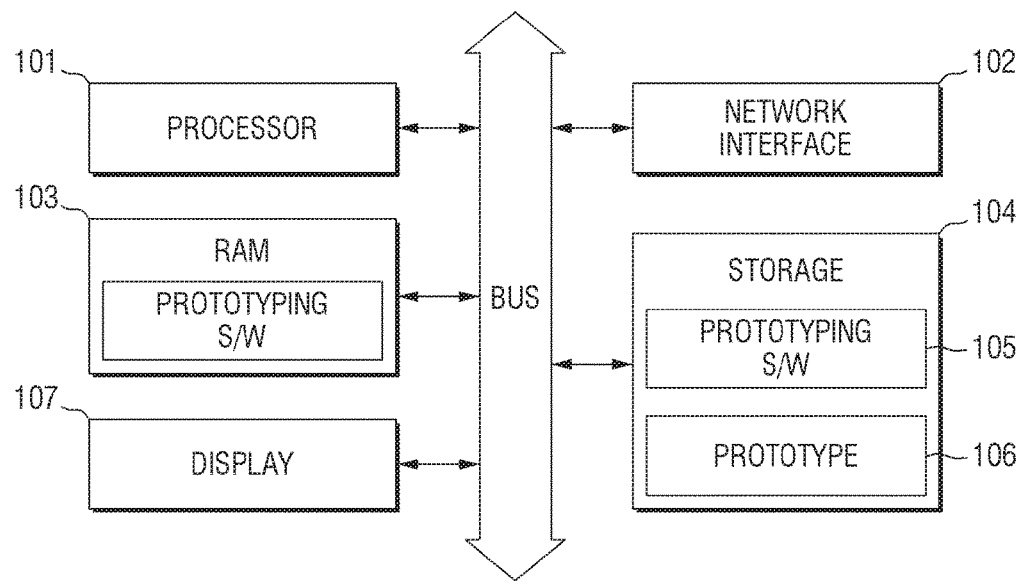
FIG. 2 is a block diagram of a terminal for prototyping a GUI according to an embodiment.

The prototyping terminal 100 will now be described in detail with reference to FIG. 2. FIG. 2 is a block diagram of a GUI prototyping terminal 100 according to an embodiment.

Referring to FIG. 2, the prototyping terminal 100 may include a processor 101, a network interface 102, a memory 103, a storage 104, and a display 107. Although not illustrated in the drawing, the prototyping terminal 100 may include an input unit used to receive various inputs from a user of the prototyping terminal 100.

The processor 101 controls the overall operation of each component of the prototyping terminal 100. The processor 101 may include a central processing unit (CPU), a microprocessor unit (MPU), a micro-controller unit (MCU), or any form of processor well known in the art to which the inventive concept pertains. In addition, the processor 101 may perform an operation on at least one application or program for executing methods according to embodiments of the inventive concept. The prototyping terminal 100 may include one or more processors.

The network interface 102 supports wired and wireless Internet communication of the prototyping terminal 100. In addition, the network interface 102 may support various communication methods as well as Internet communication. To this end, the network interface 102 may include various communication modules.

The network interface 102 may transmit a generated prototype of an interface to the execution terminal 200 through the Internet. In this case, the execution terminal 200 may display the received prototype and display objects of the displayed prototype. When the state of an object displayed is changed, the execution terminal 200 may change the display state of another object.

Figure 3:
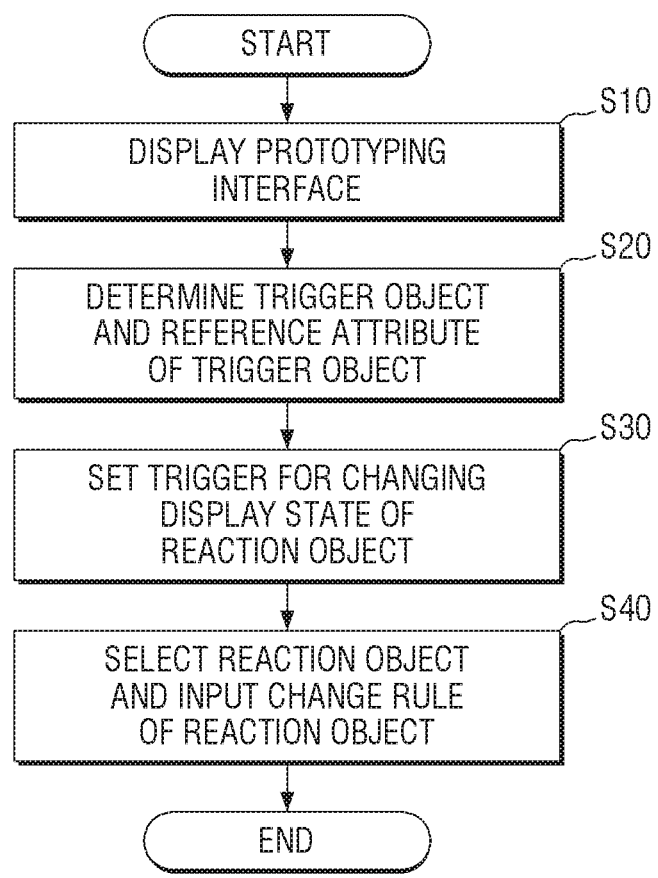
FIG. 3 is a flowchart illustrating a method of prototyping a GUI according to an embodiment.

In addition, according to an embodiment, the network interface 102 may provide the execution terminal 200 with access to the prototyping terminal 100 so that the execution terminal 200 can execute a prototype. In this case, the execution terminal 200 may access the prototyping terminal 100 and execute a generated prototype. The memory 103 stores various data, commands and/or information. To execute methods of prototyping a GUI according to embodiments, the memory 103 may load one or more programs 105 from the storage 104. In FIG. 3, a random access memory (RAM) is illustrated as an example of the memory 103.

The storage 104 may non-temporarily store data received from an external device 300. The storage 104 may include a nonvolatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the inventive concept pertains.

The storage 104 may store one or more programs 105 for executing methods according to embodiments. In FIG. 3, prototyping software is illustrated as an example of the programs 105.

The storage 104 may receive inputs and various settings required for building a prototype from the execution terminal 200 or the user of the prototyping terminal 100 and store the received inputs and settings. In addition, the storage 104 may store a trigger module which is referred to in some embodiments.

The display 107 displays various data, commands and/or information of the prototyping terminal 100. In particular, the display 107 may be implemented as a touchscreen having a touch sensor. When a prototyping program is executed on the prototyping terminal 100, the display 107 may display a prototyping interface.

According to an embodiment, the display 107 may display one or more objects and changes in display states of the objects on an area of the prototyping interface.

In this case, when sensing a change in the display state of an object on the display 107, the processor 101 may determine whether there is a trigger setting for the sensed change. If the trigger setting for the change exists, the processor 101 may control the display state of another object to be changed according to the trigger setting. The display 107 may also display the change in the display state of the another object.

The input unit may receive an input for setting a change in a reference attribute of an object as a trigger for changing the display state of another object from a user. If the input is received from the execution terminal 200, it may be received through the network interface 102 as described above.

While the configuration and operation of the prototyping terminal 100 have mainly been described above, the above embodiment may be applied the same to the execution terminal 200 if the execution terminal 200 executes a prototyping method according to an embodiment. That is, an embodiment related to the execution of a prototype in the above description of the prototyping terminal 100 may be applied the same to the execution terminal 200. In addition, the execution terminal 200 may include each component of the prototyping terminal 100.

It will hereinafter be assumed that methods according to embodiments are performed by the prototyping system.

Embodiments of the inventive concept will now be described in detail based on the above description of FIGS. 1 and 2. The embodiments described below can be performed not only separately but also in combination. In addition, the embodiments described below can be performed in combination with the embodiments described above with reference to FIGS. 1 and 2.

FIG. 3 is a flowchart illustrating a method of prototyping a GUI according to an embodiment.

Referring to FIG. 3, the prototyping terminal 100 may display a prototyping interface (operation S10). Here, the prototyping interface may be a tool for designing a prototype of a GUI. The prototyping terminal 100 may receive a chain reaction rule through the prototyping interface.

The prototyping terminal 100 may receive a selected trigger object and a reference attribute of the trigger object through the prototyping interface (operation S20). That is, the prototyping terminal 100 may display a menu for selecting various objects and a menu for selecting reference attributes of objects on the prototyping interface. Then, a user may select a trigger object and a reference attribute of the trigger object through the prototyping interface. The prototyping terminal 100 may also receive a trigger range.

As used herein, a trigger object refers to an object which triggers the rectilinear movement, curvilinear movement or a change in the opacity of another object different from the trigger object through a change in the value of a reference attribute of the trigger object. In addition to the movement or change in the opacity of the another object, the trigger object can trigger various graphic effects of the another object. That is, the trigger object refers to an object which changes the display state of the another object. Here, a change in the value of the reference attribute of the trigger object may function as a trigger for changing the display state of the another object. In addition, a trigger range refers to a range in which the value of the reference attribute of the trigger object is changed. That is, when the value of the reference attribute of the trigger object is changed by the trigger range, the display state of the another object on the execution terminal 200 may be changed. The trigger range may include a start value and an end value of the reference attribute of the trigger object. In operation S20, the prototyping terminal 100 may receive, through the prototyping interface, the trigger range together with the trigger object selected and the reference attribute of the trigger object.

According to an embodiment, the prototyping terminal 100 may provide recommended values for the start and end values of the trigger range based on the reference attribute of the trigger object and a trigger range in another pre-registered chain reaction rule. It is assumed that a selected trigger object is reused in a prototype being written or that another reference attribute value is to be changed in a prototype for the selected trigger object. The current embodiment can also be applied to a case where there are a registered reference attribute value and a registered trigger range for a specific object.

In this case, the prototyping terminal 100 may recommend a trigger range for the selected trigger object through the prototyping interface in view of the position of the trigger object in the prototype and the size of the trigger object displayed on the execution terminal 200.

For example, object A may be selected, and an x-axis coordinate of object A may be selected as a reference attribute of object A in operation S20. In addition, (x, y) coordinates of object A may be (50, 100), and the size of object A may be (x*y)=(200*300). In this case, the prototyping terminal 100 may recommend a range from a start point of 50 to an end point of 250 on the x-axis as a trigger range of object A.

Even if there is a pre-registered trigger range for object A, the prototyping terminal 100 can also recommend a trigger range for object A. The prototyping terminal 100 may recommend a next range adjacent to the pre-registered range as a trigger range of object A.

For example, if the pre-registered trigger range of object A is a coordinate range of 100 to 200 on the x-axis, the prototyping terminal 100 may recommend a range of 200 to 300 or a range of 0 to 100 as a trigger range of object A.

The prototyping terminal 100 may receive, through the prototyping interface, an input for setting a change in the value of the reference attribute of the trigger object as a trigger for changing the display state of a reaction object (operation S30). In particular, the prototyping terminal 100 may receive an input for setting a change in the value of the reference attribute value of the trigger object within the trigger range as the trigger. To this end, the prototyping interface may include an interface for setting a trigger.

As used herein, a reaction object refers to an object whose display state is changed by a change in the value of a reference attribute of a trigger object. The value of the reference attribute of the trigger object may be changed by a manufacturer's input to the prototyping terminal 100. Alternatively, if a prototype is displayed on the execution terminal 200, the display state of the trigger object may be changed by a user's input to the displayed prototype. As the reference attribute value or the display state of the trigger object is changed, the display state of the reaction object on the execution terminal 200 may be changed. The prototyping terminal 100 may store a change in the value of the reference attribute of the trigger object as a trigger setting for changing the display state of the reaction object.

The execution terminal 200 may receive a prototype generated by the prototyping terminal 100 and display a trigger object. The execution terminal 200 may sense a change in the display state of the displayed trigger object. Here, the change in the display state of the trigger object may include at least one of the rectilinear movement of the trigger object, the curvilinear movement of the trigger object, the movement of the trigger object along an atypical path, a change in the opacity of the trigger object, and various graphic effects of the trigger object.

When sensing a change in the display state of the trigger object, the execution terminal 200 may change the display state of a reaction object according to a change rule. That is, when the display state of the trigger object is changed, the execution terminal 200 may change the display state of the reaction object by considering the change in the display state of the trigger object as a trigger. To this end, after operation S30, the prototyping terminal 100 may receive a selected reaction object whose display state on the execution terminal 200 is changed by the set trigger. In addition, the prototyping terminal 100 may receive a change rule of the reaction object (operation S40).

In operation S40, the prototyping terminal 100 may also receive another change rule different from the change rule of the reaction object. In this case, the prototyping terminal 100 may come up with a different value for the trigger range based on the change rule of the reaction object and the another change rule and recommend the value through the prototyping interface.

Specifically, in the above example, the prototyping terminal 100 may receive an additional trigger range including start and end values different from those of the pre-input trigger range of 100 to 200 along the x-axis for object A. The prototyping terminal 100 may also automatically recommend the additional trigger range through the display 107. Here, it is assumed that a change rule has been set in such a way that when trigger object A moves from (100, 0) to (200, 0) along the x-axis, reaction object B moves from (100, 100) to (200, 200) along (x, y) coordinates on the execution terminal 200 according to the trigger set in operation S30 and that a change rule has been set in such a way that when trigger object A moves from (100, 0) to (200, 0) along the x-axis, reaction object C rotates at 0 to 90 degrees in a clockwise direction according to the trigger set in operation S30. In addition, it is assumed that a change rule has been set in such a way that the size of reaction object D is changed from (10*10) to (30*30) on the execution terminal 200 as the value of a reference attribute of trigger object A changes After receiving the additional trigger range, the prototyping terminal 100 may display a menu for inputting change rules opposite to the above change rules on the prototyping interface. Then, a user of the prototyping terminal 100 may select the menu for inputting the opposite change rules.

When the menu is selected, the prototyping terminal 100 may automatically generate the change rules opposite to the above change rules. In addition, the prototyping terminal 100 may recommend the automatically generated change rules.

In this case, the prototyping terminal 100 may receive an x-axis range of 200 to 300 as an additional trigger range of object A. When a user selects the menu for inputting the opposite change rules, the prototyping terminal 100 may generate a change rule that makes object B move from (200, 200) to (100, 100) on the execution terminal 200, a change rule that makes object C rotate at 90 to 0 degrees in a counterclockwise direction on the execution terminal 200 and a change rule that makes the size of object D change from (30*30) to (10*10) on the execution terminal 200 and recommend the generated change rules to the user through the display 107.

Figure 4:
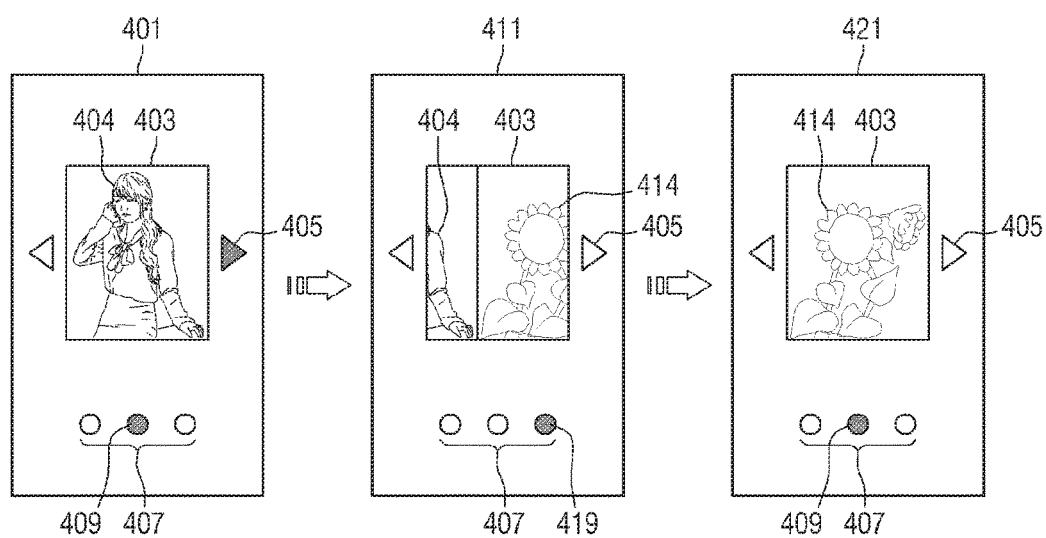
FIG. 4 illustrates the relationship between a trigger object and a reaction object, which is referred to in some embodiments.

FIG. 4 illustrates the relationship between a trigger object and a reaction object, which is referred to in some embodiments. In particular, interfaces 401 through 421 are illustrated in FIG. 4 as examples of a GUI displayed on the execution terminal 200. The interfaces 401, 411 and 421 may be GUIs completed based on a prototype made using a method of prototyping a GUI according to an embodiment. It is assumed that the GUIs are applied to the execution terminal 200. In addition, it is assumed that a trigger object is an object 403 which outputs images 404 and 414, and a reaction object is an indicator 407 which indicates an output page.

Referring to FIG. 4, when a user swipes to the left on the interface 401, the execution terminal 200 may change the display state of the trigger object from a state in which the image 404 is displayed to a state in which the image 414 is displayed. Here, the reaction object 407 may indicate a current page 409 on the interface 401 of the execution terminal 200.

As an example of a process of changing the display state of the trigger object in response to the swipe input, the interface 411 is illustrated. The execution terminal 200 displays a scene, in which the displayed image 404 is changed to the image 414, on the interface 411. Here, the reaction object 407 may indicate a page 410, to which the current page 409 is changed, on the interface 411 of the execution terminal 200. That is, while the display state of the trigger object 403 is changed from the state in which the image 404 is displayed to the state in which the image 414 is displayed, the display state of the reaction object 407 is changed from the page 409 to the page 419.

Then, the execution terminal 200 may display the interface 421 on which the final display state of the trigger object is displayed. Here, the reaction object 407 may indicate the current page 409 on the interface 421 of the execution terminal 200.

When the user taps an object 405 on the interface 401, the execution terminal 200 may operate in the same way as described above. In this case, the display state of the reaction object 407 is changed in the same way as when the display state of the trigger object is changed by the swipe input. According to an embodiment, the display state of the reaction object is changed according to a change in the display state of the trigger object, not according to a user's swipe input or tap input on the object 405.

The interfaces 401, 411 and 421 on which the display state of the reaction object and the display state of the trigger object are changed as in FIG. 4 may be prototyped as follows.

In operation S20, the prototyping terminal 100 may receive one or more user input methods set as a trigger for changing the display state of the trigger object. As in the example of FIG. 4, the user input methods may include the swipe input and the tap input on the object 405.

Accordingly, in operation S30, the prototyping terminal 100 may receive, through the prototyping interface, an input for setting a change in the value of the reference attribute of the trigger object as the trigger regardless of the user input methods.

The execution terminal 200 which receives a prototype may identify a change in the display state of the trigger object as the trigger regardless of the user input methods.

Accordingly, the execution terminal 200 may change the display state of the reaction object according to a change rule of the reaction object.

Figure 5:
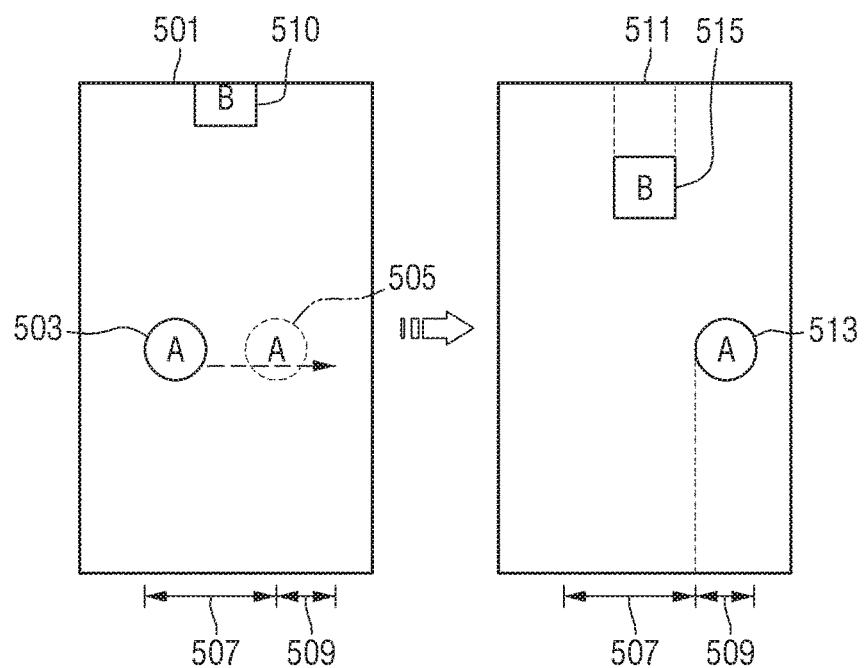
FIGS. 5 and 6 illustrate example trigger inputs for changing the display state of a reaction object, which are referred to in some embodiments.
Figure 6:
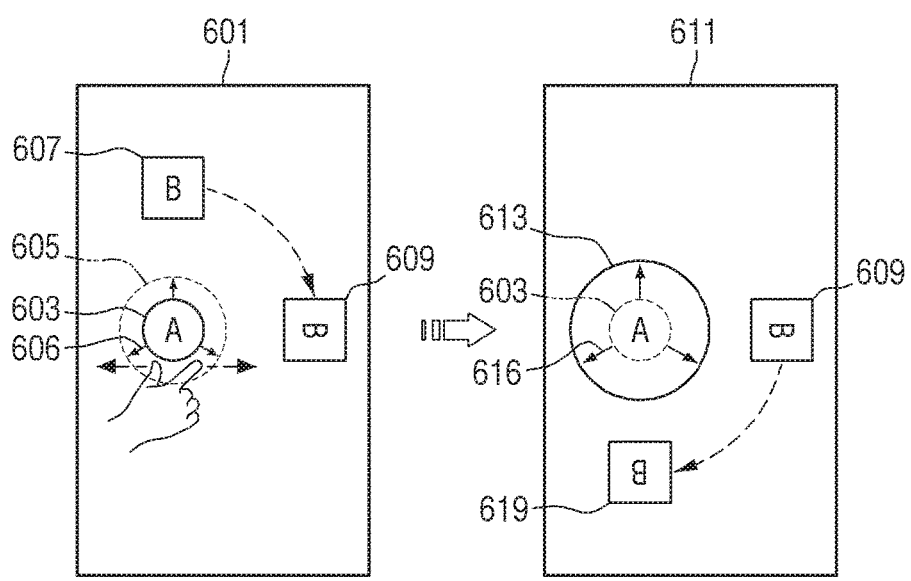

FIGS. 5 and 6 illustrate example trigger inputs for changing the display state of a reaction object, which are referred to in some embodiments. In FIGS. 5 and 6, it is assumed that interfaces 501, 511, 601 and 611 are prototypes of a GUI displayed on the display of the execution terminal 200. In this case, the interfaces 501, 511, 601 and 611 may be screens that display a simulation process performed based on user inputs to the prototypes.

It will hereinafter be assumed that a trigger object is object A, and a reaction object is object B.

In FIG. 5, a case where downward rectilinear movement from an upper end of the screen has been input as a change rule for the display state of object B to prototype the interfaces 501 and 511 is illustrated. In addition, in FIG. 5, a case where the rectilinear movement of object A over a distance 507 has been set as a trigger for changing the display state of object B from a first state 510 to a second state 515 is illustrated. Referring to FIG. 5, the trigger may also be a change in the display state of object A from a state 503 to a state 505.

The interfaces 501 and 511 of FIG. 5 may be prototyped as follows.

On the prototyping interface of the prototyping terminal 100, object A may be selected as a trigger object, and an x-axis coordinate of object A may be set as a reference attribute of object A.

In addition, the trigger may be set on the prototyping interface of the prototyping terminal 100. In this case, the execution terminal 200 may receive a prototype and display the received prototype. In addition, when the display state of object A is changed from the state 503 to the state 505 according to the rectilinear movement of the object A over the distance 507, the execution terminal 200 may sense the change in the display state of object A. In particular, the execution terminal 200 can identify the trigger even when object A is moving over a distance 509 after the distance 507 and when the display state of object A is in a state 513. That is, the execution terminal 200 may sense a trigger for changing the display state of object B according to a change rule of object B at the very moment when object A passes the distance 507 or when the display state of object A is changed from the state 503 to the state 505. Accordingly, the execution terminal 200 may change the display state of object B from the first state 510 to the second state 515. That is, even when object A moves continuously after passing the distance 507, the execution terminal 200 may change the display state of object B if sensing the set trigger.

In FIG. 6, a case where a change in the scale of object A has been set as a trigger for changing the display state of object B is illustrated. The trigger may be a change in the value of the reference attribute of object A from a state 603 to a state 605. It is assumed that the change rule of object B has been set to rotation. A case where the execution terminal 200 receives a prototype generated based on the above setting and assumption will be described as an example. The execution terminal 200 may display the interfaces 601 and 611.

On the interface 601, when object A which is a trigger object is scaled up from the state 603 to the state 605 according to a user input, the execution terminal 200 may sense that the set trigger has been satisfied. Accordingly, the execution terminal 200 may change the display state of object B which is a reaction object from a first state 607 to a second state 609 according to the preset change rule. That is, the execution terminal 200 may control object B to be rotated by 90 degrees according to the degree to which object A is scaled up.

On the interface 611, when object A is scaled up to more than the state 605, the execution terminal 200 may sense this change. As object A is scaled up to a state 613, the execution terminal 200 may change the display state of object B from the state 609 to a state 619. That is, the execution terminal 200 may control object B to be rotated additionally according to the degree to which object A is scaled up.

In FIG. 6, sizes 606 and 616 of a user input for scaling up object A are illustrated. The display state of object B is not changed according to the size 606 or 616 of the user input. That is, regardless of the size 606 or 616 of the user input, the execution terminal 200 may change the display state of object B by recognizing a change in the display state of object A from the state 603 to the state 605 or to the state 613 as a trigger.

Until now, a case where the display state of one object is changed by one set trigger has mainly been described. However, the inventive concept is not limited to this case. That is, according to an embodiment, the display states of one or more objects can be changed by one set trigger. For example, while a change in the value of the reference attribute of object A is set as a trigger for changing the display state of object B in FIGS. 5 and 6, it may also be set as a trigger for changing the display states of other objects.

Accordingly, in operation S30, if a set trigger is preset as a trigger for changing the display state of at least one other object on the execution terminal 200, the prototyping terminal 100 may identify the trigger as a trigger for changing the display state of the at least one other object and, at the same time, for changing the display state of the reaction object according to the change rule. Hence, when sensing a change in the display state of the trigger object, the execution terminal 200 may change the display state of the at least one other object and, at the same time, change the display state of the reaction object according to the change rule of the reaction object.

Figure 7:
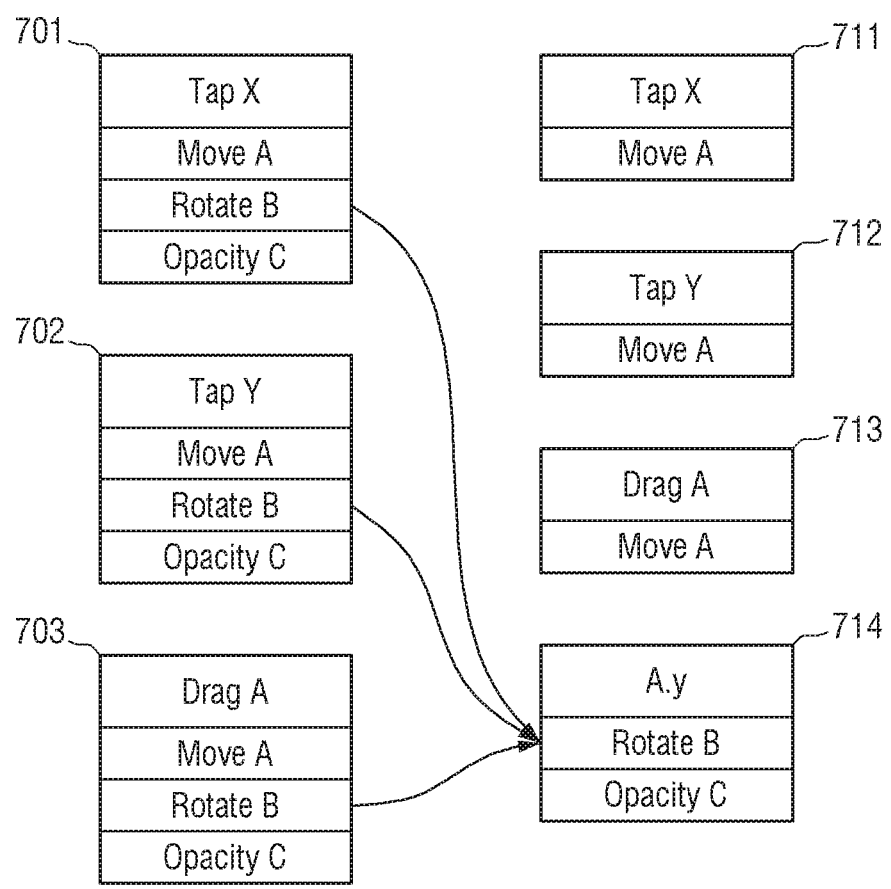
FIGS. 7 and 8 are conceptual diagrams illustrating a prototyping method according to an embodiment.
Figure 8:
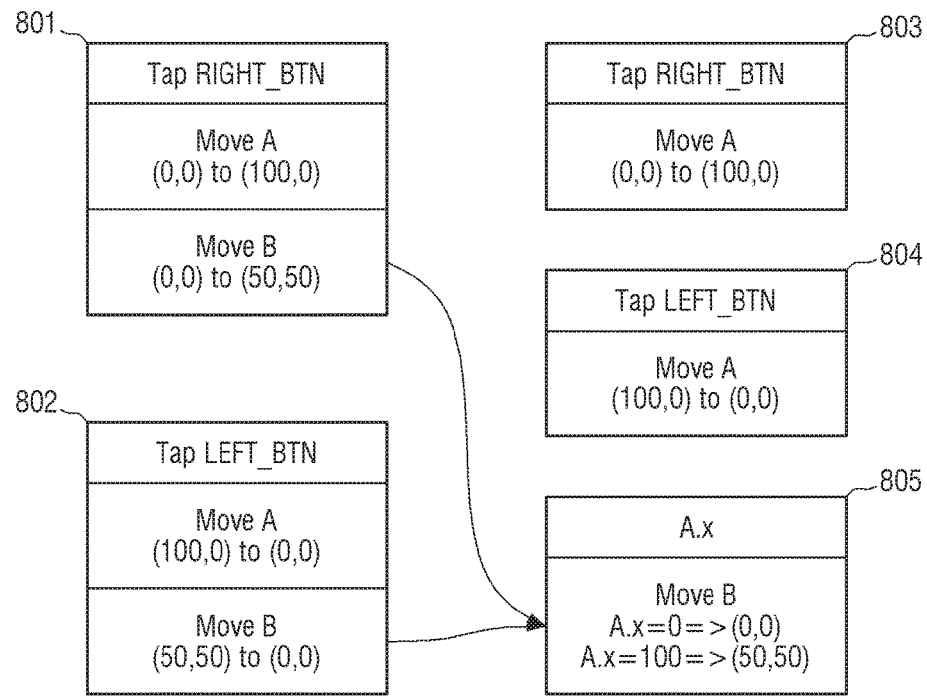

FIGS. 7 and 8 are conceptual diagrams illustrating a prototyping method according to an embodiment. The difference between a data description method of a conventional prototyping tool and a data description method of a prototyping tool according to an embodiment will be described with reference to FIGS. 7 and 8.

Referring to FIG. 7, a tap input on X, a tap input on Y, or a drag input on A may be set as a method of moving object A which is a trigger object. In the data description method of the conventional prototyping tool, a change in the display state of object B and a change in the display state of object C according to a change in the display state of object A should all be described for each method of moving object A, as in data 701, data 702 and data 703.

On the other hand, in the data description method of the prototyping tool according to the embodiment, when the methods of moving object A are described, there is no need to describe a change in the display state of object B and a change in the display state of object C, as in data 711, data 712 and data 713. That is, the description method of the prototyping tool according to the embodiment only requires a description of data 714 indicating that the display states of object B and object C are changed by a trigger. Accordingly, a user of the prototyping method according to the embodiment may describe data such a way that the display states of object B and object C are changed in response to the movement of object A regardless of a tap input on X or Y or a drag input on object A. Consequently, the user can reduce the amount of data description required to build a prototype.

Referring to FIG. 7, the data 714 illustrated as an example is described in such a way that when object A moves along a y-axis direction, object B is rotated, and opacity of object C is changed regardless of the type of an input for moving object A.

Referring to FIG. 8, according to the conventional data description method, data 801 and data 802 are described in such a way that display coordinates of object A and object B are changed according to a right-tap input and a left-tap input. On the other hand, if the prototyping method according to the embodiment is used, data 805 may be described in such a way that a change in display coordinate values of object A is set as a trigger and that the display state of object B is changed according to the trigger.

Therefore, the amount of data description can be reduced compared with the conventional data description method in which the display of object B should be described individually for each display coordinates of object A.

Each of the data 714 and the data 805 may be stored as an individual module in the prototyping terminal 100. The module may be called according to a user input on the prototyping interface and can be used in a prototype being designed by a user.

In the above example, the display state of object B on the execution terminal 200 is changed according to a change in the display state of object A set as a trigger. A user of the prototyping terminal 100 may also set a change in the display state of object B as a trigger for changing the display state of another object.

In operation S30, the prototyping terminal 100 may also receive, through the prototyping interface, an input for setting a change in the display state of the reaction object as a trigger for changing the display state of a third object different from the reaction object and the trigger object. In addition, the prototyping terminal 100 may receive the third object selected and a change rule of the third object.

The prototyping terminal 100 may map the trigger for changing the display state of the reaction object to the change rule of the reaction object and store the mapping result as a first module. Here, the first module denotes data that includes change details of the display state of the reaction object.

The prototyping terminal 100 may call a pre-stored second module, which matches the stored first module, through the prototyping interface. Here, the second module may be a module stored as a result of mapping a trigger for changing the display state of another object different from the reaction object to a change rule of the another object. For example, a trigger set to change the display state of the third object may be mapped to the change rule of the third object, and the mapping result may be stored as the second module.

In addition, the second module that matches the first module may include a module executed according to the execution of the first module. That is, the second module may be a module for an object whose display state is changed according to a change in the display state of the reaction object.

The prototyping terminal 100 may combine the first module and the second module according to a user input. By combining the first module and the second module, the prototyping terminal 100 can easily generate a prototype that can serially change the display states of a plurality of objects. The prototyping terminal 100 may also store the combined modules as one module.

The prototype generated by combining the modules may run on the execution terminal 200 as follows.

After receiving the prototype, the execution terminal 200 may display the trigger object. When sensing a change in the display state of the trigger object, the execution terminal 200 may change the display state of the reaction object according to the change rule of the reaction object. In addition, when sensing the change in the display state of the reaction object, the execution terminal 200 may change the display state of the third object according to the change rule of the third object.

For implementation of the above embodiment, on the prototyping interface of the prototyping terminal 100, the first module having a change in the display state of the trigger object as a trigger is stored for the reaction object, and the second module having a change in the display state of the reaction object as a trigger is stored for the third object.

According to an embodiment, the prototyping terminal 100 may recommend a combination of modules through the prototyping interface.

The prototyping terminal 100 may map the trigger for changing the display state of the reaction object to the change rule of the reaction object and store the mapping result as a first module. In addition, the prototyping terminal 100 may call a pre-stored third module through the prototyping interface. Here, the prototyping terminal 100 may determine whether the first module matches the third module. That is, the prototyping terminal 100 may determine whether the display states of a plurality of objects are changed serially if the first module and the third module are combined.

If determining that the first module does not match the third module, the prototyping terminal 100 may recommend a second module, which matches each of the first module and the third module, through the prototyping interface. The recommendation may be made by displaying a pop-up window for the second module or by displaying the second module on an area of the prototyping interface.

Here, the second module may include a module stored as a result of mapping the trigger for changing the display state of the third object to the change rule of the third object. In addition, the third module may include a module stored for another object whose display state is changed in response to a change in the display state of the third object set as a trigger.

In other words, if the first module and the third module selected by a user do not match, the prototyping terminal 100 may recommend the second module, which can be connected between the first module and the third module, through the prototyping interface.

When a prototype is generated by connecting the recommended second module between the first module and the third module, the execution terminal 200 may receive the generated prototype and display the received prototype. As the display state of the trigger object on the execution terminal 200 is changed, the display state of the reaction object is changed (execution of the first module). As the display state of the reaction object is changed, the display state of the third object is changed (execution of the second module). In addition, as the display state of the third object is changed, the display state of the another object is changed (execution of the third module).

Until now, a case where a change in the display state of the reaction object is set in operation S30 as a trigger for changing the display state of another object different from the trigger object and the reaction object on the execution terminal has been described. A change in the display state of the reaction object ultimately denotes a change in the value of the reference attribute of the reaction object. A case where a plurality of chain reaction rules are set for one reaction object in operation S30 will hereinafter be described. That is, this is a case where a plurality of trigger settings of one trigger object exist for one reaction object. Alternatively, this may be a case where a plurality of trigger objects exist for one reaction object.

In addition, a case where a change in the values of a plurality of reference attributes of one trigger object is set as a trigger for changing the display states of a plurality of reaction objects on the execution terminal 200 will hereinafter be described. The following embodiment may also be applied the same to a case where a change in the values of reference attributes of a plurality of trigger objects are set as a trigger for changing the display states of a plurality of reaction objects on the execution terminal 200.

For example, the prototyping terminal 100 may receive a change rule for each chain reaction rule in operation S40. That is, it is assumed that a change rule which makes reaction object C move along a straight line when an x-axis reference attribute of trigger object A is changed has been set as a chain reaction rule and that a change rule which makes reaction object C rotate when a y-axis reference attribute of trigger object B is changed has been set as a chain reaction rule.

Accordingly, when the value of the reference attribute of trigger object A is changed as, e.g., a prototype displayed on the execution terminal 200 is executed, the display state of reaction object C may be changed. Here, reaction object C moves along a straight line on the prototype according to the chain reaction rule set in relation to trigger object A. In addition, when the value of the reference attribute of trigger object B is changed as the prototype is executed, reaction object C may rotate according to the chain reaction rule set in relation to trigger object B.

In this case, the prototyping terminal 100 may receive a priority order preset for a plurality of chain reaction rules set for object C. Therefore, when sensing a plurality of triggers, that is, when sensing a simultaneous change in the values of the reference attributes of trigger object A and trigger object B, the execution terminal 200 may judge the priority order of the chain reaction rules including the triggers. Based on the judgment, the execution terminal 200 may change the display state of reaction object C according to a chain reaction rule with the highest priority.

For example, if the chain reaction rule related to trigger object A takes priority over the chain reaction rule related to trigger object B, the execution terminal 200 may control reaction object C to move along a straight line on the prototype.

That is, even if the values of reference attributes of a plurality of trigger objects are changed, the execution terminal 200 may ignore change rules of chain reaction rules with low priority, so that the change rules are not reflected in the prototype.

According to an embodiment, the execution terminal 200 may determine whether any one of the chain reaction rules can be combined with the chain reaction rule with the highest priority. That is, the execution terminal 200 may determine whether the change rule of any one of the chain reaction rules excluding the chain reaction rule with the highest priority can be combined with the change rule of the chain reaction rule with the highest priority.

If determining that any one of the chain reaction rules excluding the chain reaction rule with the highest priority can be combined with the chain reaction rule with the highest priority, the execution terminal 200 may combine the change rule of the chain reaction rule with the highest priority with the change rule of the combinable chain reaction rule. In addition, the execution terminal 200 may change the display state of the reaction object according to the combined change rules.

In the above example, the change rule of the chain reaction rule set in relation to trigger object A is the rectilinear motion of reaction object C, and the change rule of the chain reaction rule set in relation to trigger object B is the rotary motion of reaction object C. Here, the change rule of the chain reaction rule with the highest priority may be the rectilinear motion of reaction object C, and the change rule of the combinable chain reaction rule may be the rotary motion of reaction object C. In this case, if the two change rules can be combined, when the values of reference attributes of a plurality of trigger objects are changed, the execution terminal 200 may change the display state of reaction object C such that reaction object C rotates and moves along a straight line. That is, the execution terminal 200 may change the display state of reaction object C such that reaction object C moves along an oval path by reflecting the rotary motion in the rectilinear motion as the prototype is executed.

If the above two change rules cannot be combined, the execution terminal 200 may control only the change rule of the chain reaction rule with the highest priority to be executed on the prototype.

The priority order and combinability may be set in the prototyping terminal 100 by a user.

A plurality of chain reaction rules may also be set between a plurality of trigger objects and a plurality of reaction objects. For example, if a first chain reaction rule is set between trigger object A and reaction objet B, reaction object B may be set as a trigger object of reaction object C which is another reaction object. That is, a second chain reaction rule may be set between trigger object B and reaction object C.

Figure 9:
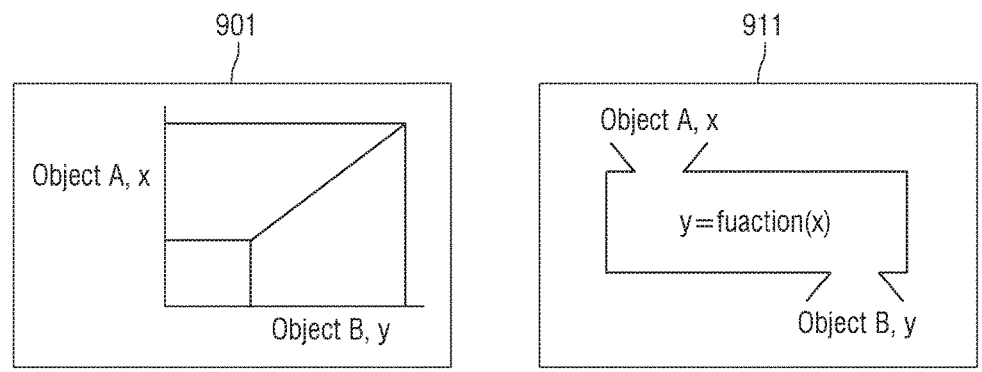
FIG. 9 illustrates a linear function model and a nonlinear function model for changing the display state of an object, which are referred to in some embodiments.
Figure 10:
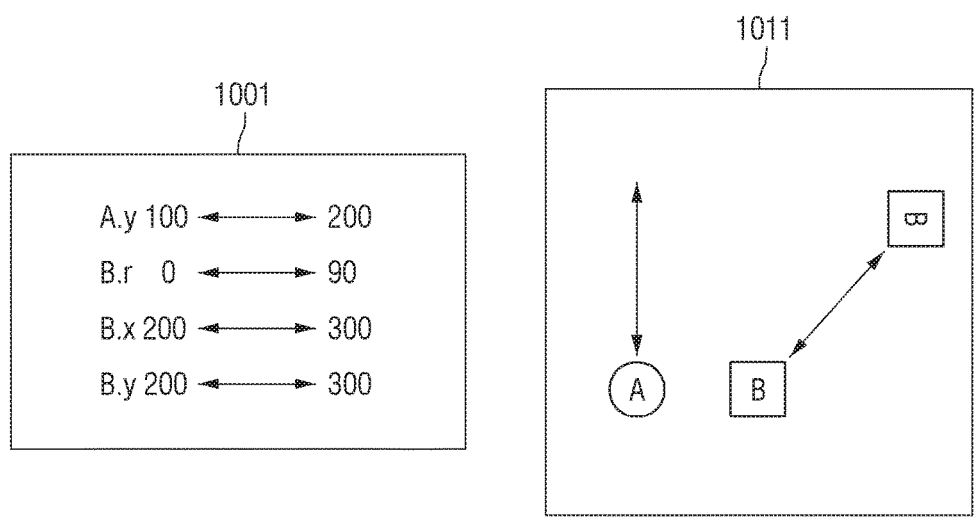
FIG. 10 illustrates an example of a case where the display state of an object is changed linearly, which is referred to in some embodiments.
Figure 11:
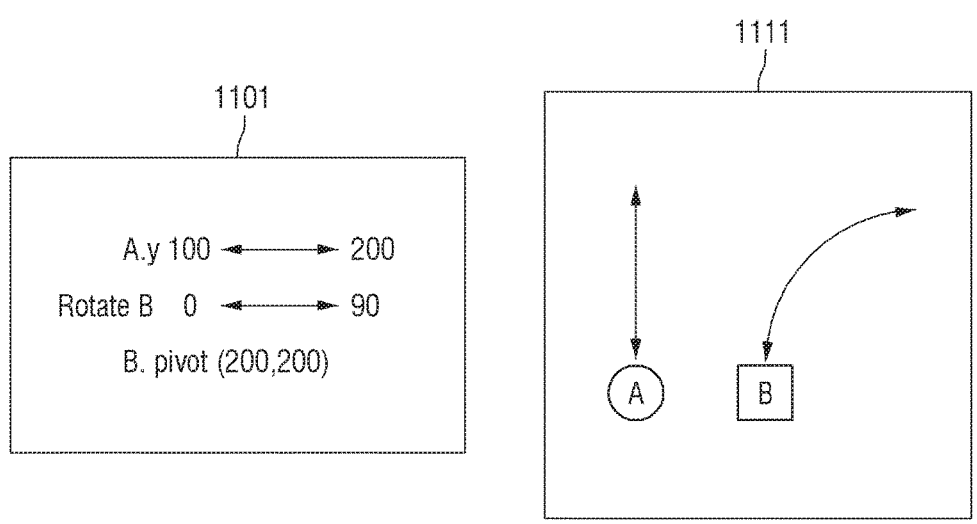
FIG. 11 illustrates an example of a case where the display state of an object is changed nonlinearly, which is referred to in some embodiments.

FIG. 9 illustrates a linear function model and a nonlinear function model for changing the display state of an object, which are referred to in some embodiments. In addition, FIG. 10 illustrates an example of a case where the display state of an object is changed linearly, which is referred to in some embodiments. FIG. 11 illustrates an example of a case where the display state of an object is changed nonlinearly, which is referred to in some embodiments.

In the embodiment of FIG. 4, the display state of a reaction object is changed linearly according to a change in the display state of a trigger object. To this end, a linear function model 901 of FIG. 9 is used as a change rule of the reaction object. Accordingly, a case where the display state of the reaction object is changed linearly according to a change in the display state of the trigger object is illustrated in FIG. 4.

Referring to FIG. 10, a data description method in a case where a linear function model is used as a change rule is as follows. Data 1001 is described in such a way that object B is rotated by 90 degrees and its coordinates are changed in response to the movement of object A in the y-axis direction which is set as a trigger. As an example of a change in the display state of an object according to the data 1001, an interface 1011 is illustrated.

On the interface 1011, object B is rotated, but its movement path is a straight line. That is, since the conventional prototyping tool uses a linear model as a change rule, it is possible to generate a prototype on which object B moves along a straight line as in the case of the interface 1011, but impossible to generate a prototype on which object B moves along a curved path.

On the other hand, if the prototyping tool according to the embodiment is used, a change rule for the display state of an object may include an attribute indicating that the display state of an object is changed nonlinearly in response to a change in the display state of another object. That is, according to an embodiment, a nonlinear function model 911 of FIG. 9 may also be used as a change rule.

In this case, when sensing a change in the display state of the trigger object, the execution terminal 200 may nonlinearly change the display state of the reaction object according to the degree to which the display state of the trigger object is changed. To this end, the change rule of the reaction object may include a rule that makes the display state of the reaction object be changed nonlinearly on the execution terminal 200 when the value of the reference attribute of the trigger object is changed.

Referring to FIG. 11, a data description method in a case where a nonlinear function model is used as a change rule is as follows. Data 1101 is described in such a way that object B rotates at 90 degrees in response to the movement of object A in the y-axis direction which is set as a trigger. In particular, the data 1101 is described in such a way that object B rotates about a pivot. As an example of a change in the display state of an object according to the data 1101, an interface 1111 is illustrated. In particular, a case where object B rotates along a curved path on the interface 1111 is illustrated.

Figure 12:
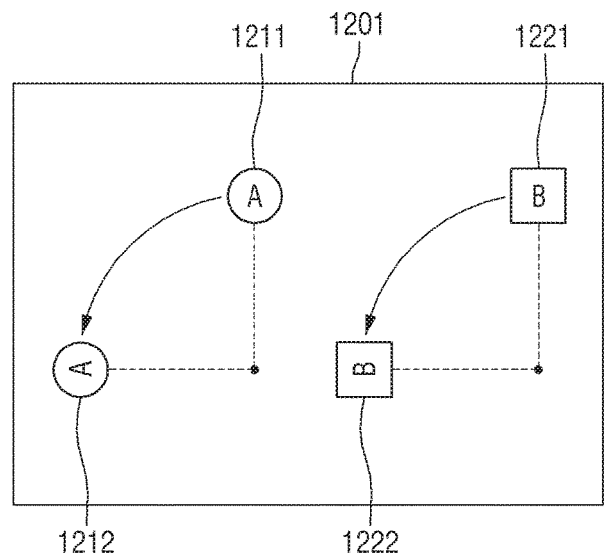
FIG. 12 illustrates a pivot about which an object rotates, which is referred to in some embodiments.

FIG. 12 illustrates a pivot about which an object rotates, which is referred to in some embodiments. In FIG. 12, object B is illustrated as an example of a reaction object, and object A is illustrated as an example of a trigger object.

In operation S40, the prototyping terminal 100 may receive a pivot, a rotation angle, a rotation axis, and a rotation direction required to rotate the reaction object nonlinearly. Therefore, the prototyping terminal 100 may rotate the reaction object about the pivot at the rotation angle, around the rotation axis and in the rotation direction according to the degree to which the display state of the trigger object is changed.

Referring to FIG. 12, it is assumed that the display state of object B is changed from a first state 1221 to a second state 1222 in response to a change in the display state of object A from a state 1211 to a state 1212 which is set as a trigger. In this case, coordinates of object A which are changed as object A rotates do not linearly correspond to coordinates of object B which are changed as object B are rotated. Therefore, a nonlinear function model should be used as a change rule of object B.

In the data description method of the prototyping tool according to the embodiment, when a pivot about which object A rotates is (0, 0), a pivot about which object B rotates may be set to coordinates (100, 0), and the rotation angle may be set to 0 to 270 degrees. In this case, a prototype such as an interface 1201 may be generated.

Until now, a case where a nonlinear function module is used as a change rule of an object has been described with reference to FIGS. 11 and 12. The nonlinear function model is used not just to rotate an object about a pivot. The nonlinear function model can also be used if there is, e.g., a movement path that a user desires to express.

Figure 13:
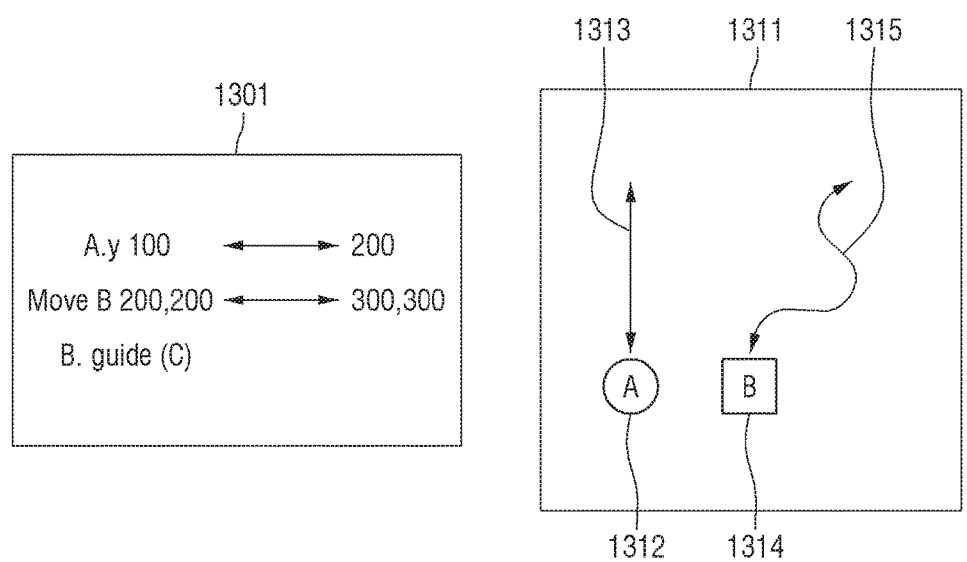
FIG. 13 illustrates the movement of an object along a preset movement path, which is referred to in some embodiments.

FIG. 13 illustrates the movement of an object along a preset movement path, which is referred to in some embodiments.

In operation S40, the prototyping terminal 100 may receive a movement path of the reaction object through the prototyping interface. Here, the change rule of the reaction object may include a rule that makes the reaction object move along the received movement path on the execution terminal 200 in nonlinear response to a change in the value of the reference attribute of the trigger object. Therefore, the execution terminal 200 may move the reaction object along the received movement path according to the degree to which the display state of the trigger object is changed.

Referring to FIG. 13, data 1301 is described in such a way that object B moves along guide path C in response to the movement of object A along the y-axis. According to the data 1301, object B moves from coordinates (200, 200) to coordinates (300, 300) in response to the movement of object A set as a trigger.

As an example of a change in the display state of an object according to the data 1301, an interface 1311 is illustrated. In particular, a case where, as object A 1312 moves over a distance 1313 in the y-axis direction, object B 1314 moves along a path 1315 on the interface 1311 is illustrated.

That is, since a nonlinear function model is used, the prototyping terminal 100 can generate a prototype on which the display state of object B is changed along a curved movement path like the path 1315 input by a user.

Figure 14:
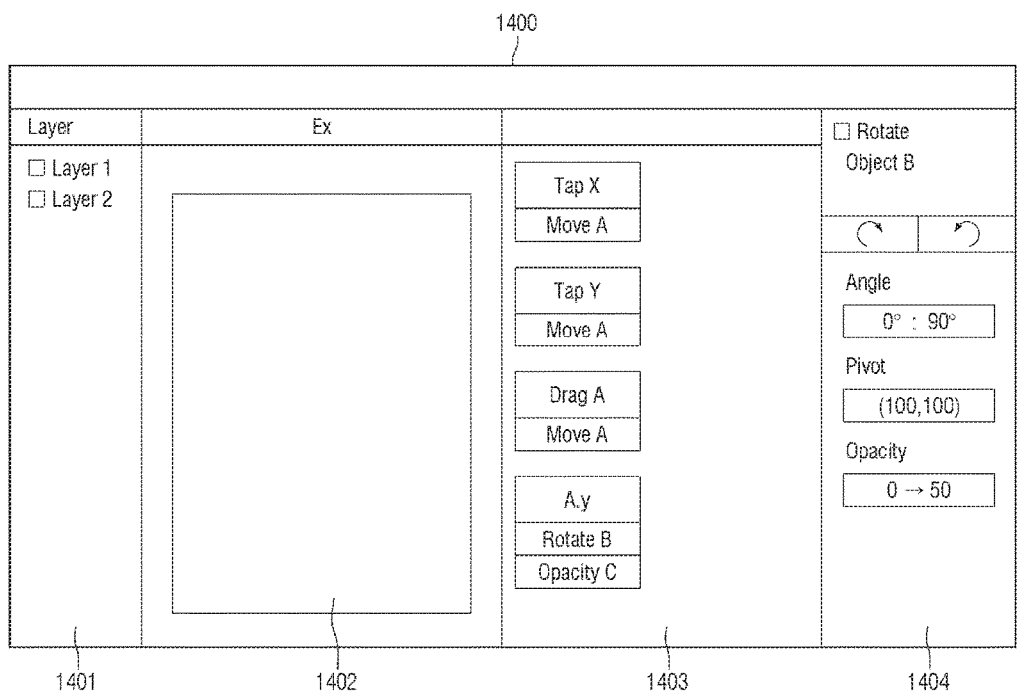
FIG. 14 illustrates an example prototyping interface which is referred to in some embodiments.

FIG. 14 illustrates an example prototyping interface 1400 which is referred to in some embodiments. Referring to FIG. 14, the prototyping interface 1400 may include an area 1401 for selecting a prototyping job, an area 1402 for designing a prototype, an area 1403 for describing data, and an area 1404 for inputting a change rule and a trigger setting of each object. According to an embodiment, the area 1402 may include an area for performing prototype simulations.

The prototyping terminal 100 may display the interface 1400 and receive user-selected objects and various setting inputs through the interface 1400. According to the embodiment, objects may be displayed in the area 1402, and the prototyping terminal 100 may display a scene, in which the display state of each object is changed, in the area 1402.

A case where modules are executed serially has been described above with reference to FIGS. 7 and 8. In the process in which a user is building a prototype, modules may be combined, thereby generating a trigger loop. That is, in a state where a change in a reference attribute of a trigger object is set as a trigger for changing the display state of a reaction object, a change in the display state of the trigger object may be set again as a trigger for changing the display state of the reaction object. In this case, when the display state of the trigger object is changed, a prototype may change the display state of the reaction object and then change the display state of the trigger object again. This operation may be repeated indefinitely. According to an embodiment, the prototyping terminal 100 may output a notice for preventing this situation through the prototyping interface.

Figure 15:
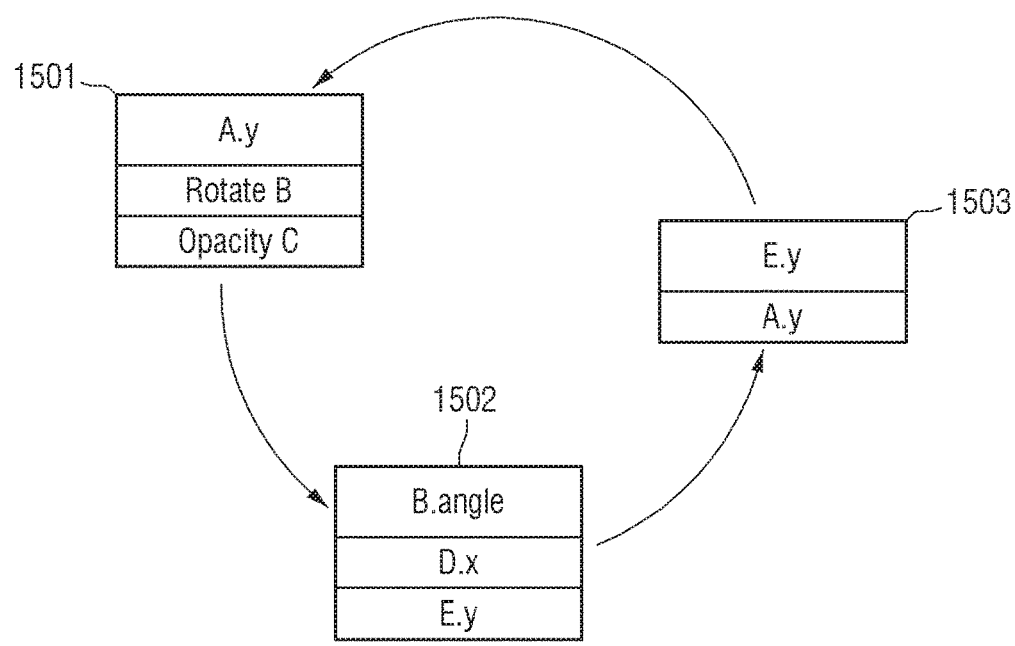
FIG. 15 illustrates an example trigger loop which is referred to in some embodiments.

FIG. 15 illustrates an example trigger loop which is referred to in some embodiments. Referring to FIG. 15, in data 1501, the movement of object A along the y-axis is set as a trigger for changing the display state of object B and the display state of object C. In addition, in data 1502, a change in an angle of object B is set as a trigger for changing display state of object D and the display state of object E. In addition, in data 1503, the movement of object E along the y-axis is set as a trigger for moving object A along the y-axis.

In this case, if object A moves once along the y-axis on a prototype, the display states of the above objects are changed indefinitely according to the data 1501, the data 1502 and the data 1503.

To prevent this situation, when a trigger is set, the prototyping terminal 100 may determine whether a trigger loop such as the one described above is generated. In operation S30, the prototyping terminal 100 may receive an input for setting a trigger for changing the display state of the trigger object through the prototyping interface. Here, if the trigger for changing the display state of the trigger object includes a change in the display state of the reaction object, the prototyping terminal 100 may output a notice for informing about the generation of a trigger loop through the prototyping interface. For example, the prototyping terminal 100 may display a message popup for informing about the generation of the trigger loop on the prototyping interface. Alternatively, the prototyping terminal 100 may display a warning message for informing about the generation of the trigger loop on an area of the prototyping interface. In this case, the area may also be an area for informing about the occurrence of an error during a data description process for building a prototype.

According to the inventive concept, a method and apparatus which enable a user to easily prototype a GUI can be provided.

In addition, according to the inventive concept, if there are a plurality of user input methods that cause an object to perform the same function on a GUI, there is no need to define a function performed for each of the user input methods.

That is, according to the inventive concept, it can be defined that the function is performed according to a change in the state of the object. Therefore, the amount of description required to build a prototype can be reduced.

In addition, according to the inventive concept, a method and apparatus in which a change in the state of an object functions as a trigger input for changing the state of another object can be provided.

In addition, according to the inventive concept, a prototype of a GUI on which the display state of an object is changed nonlinearly in response to a change in the display state of another object can be provided.

What is claimed is:

1. A method for prototyping a graphic user interface (GUI) by a prototyping system, the method comprising:
   receiving, by a prototyping terminal, through a prototyping interface,
      a first user setting for designating a first user input on a first object for reacting a trigger object,
      a second user setting for designating a second user input on a second object for reacting the trigger object, and
      third user settings for designating the trigger object, a reference attribute of the trigger object, a trigger range of a first chain reaction rule, a reaction object, and a change rule of the first chain reaction rule, wherein the first chain reaction rule does not include information on the first user input and the second user input;
   determining, by a prototype execution terminal, when the first user input or the second user input is detected, whether a change in a value of the reference attribute of the trigger object is within the trigger range of the first chain reaction rule; and
   automatically changing, by the prototype execution terminal, a display effect of the reaction object according to the change rule of the first chain reaction rule, in response to determining that the change in the value of the reference attribute of the trigger object is within the trigger range.

2. The method of claim 1, wherein the receiving of the third user settings for designating the trigger object, the reference attribute, the trigger range, the reaction object, and the change rule of the first chain reaction rule comprises:
   receiving the trigger range which comprises a start value and an end value of the reference attribute;
   receiving, through the prototyping interface, an input for setting a change in the value of the reference attribute of the trigger object within the trigger range as a trigger for changing the display effect of the reaction object on the prototype execution terminal; and
   receiving a selection of the reaction object and the change rule of the reaction object through the prototyping interface.

3. The method of claim 2, wherein the receiving of the trigger range comprises providing recommended values for the start value and the end value of the trigger range based on the reference attribute of the trigger object and a trigger range in another pre-registered chain reaction rule.

4. The method of claim 2, wherein the receiving of the selection of the reaction object and the change rule of the reaction object comprises:
   receiving an additional trigger range which comprises start and end values different from those of the received trigger range;
   receiving an input for selecting a menu for inputting a change rule opposite to the change rule;
   automatically generating the change rule opposite to the change rule according to the menu is selected; and
   providing a recommendation of the automatically generated change rule.

5. The method of claim 1, wherein the receiving of the third user settings for designating the trigger object, the reference attribute, the trigger range, the reaction object, and the change rule of the first chain reaction rule for the trigger object comprises:
   receiving a chain reaction rule for the reaction object through the prototyping interface; and
   outputting a notice for informing about the generation of a trigger loop through the prototyping interface when the received chain reaction rule for the reaction object sets the display effect of the trigger object to change as a value of a reference attribute of the reaction object is changed within a trigger range of the chain reaction rule for the reaction object on the prototype execution terminal.

6. The method of claim 1, wherein the receiving of the third user settings for designating the trigger object, the reference attribute, the trigger range, the reaction object, and the change rule of the first chain reaction rule comprises:
   receiving a second chain reaction rule through the prototyping interface;
   sensing, by the prototype execution terminal, a change in the value of the reference attribute of the reaction object within a trigger range of the second chain reaction rule; and
   changing, by the prototype execution terminal, a display effect of another object according to a change rule of the second chain reaction rule when sensing the change in the value of the reference attribute of the reaction object,
   wherein the another object is an object whose display effect is set in the second chain reaction rule to change in response to a change in the value of the reference attribute of the reaction object set as a trigger.

7. The method of claim 1, wherein when the reaction object is a reaction object for a plurality of trigger objects, the automatically changing of the display effect of the reaction object according to the change rule of the first chain reaction rule comprises:
   determining a preset priority order of respective chain reaction rules of the trigger objects for the reaction object; and
   changing the display effect of the reaction object according to a change rule of a chain reaction rule with the highest priority.

8. The method of claim 7, wherein the determining of the preset priority order of the respective chain reaction rules of the trigger objects for the reaction object comprises:
   determining whether any one of the chain reaction rules excluding the chain reaction rule with the highest priority can be combined with the chain reaction rule with the highest priority;
   changing the display effect of the reaction object by combining the change rule of the chain reaction rule with the highest priority with a change rule of a combinable chain reaction rule when determining that any one of the chain reaction rules excluding the chain reaction rule with the highest priority can be combined with the chain reaction rule with the highest priority.

9. The method of claim 1, wherein the first chain reaction rule comprises one or more change rules for changing the display effect of the reaction object on the prototype execution terminal.

10. The method of claim 1, wherein the receiving of the third user settings for designating the trigger object, the reference attribute, the trigger range, the reaction object, and the change rule of the first chain reaction rule comprises:
    receiving an input for setting one or more user input methods for changing the value of the reference attribute of the trigger object on the prototype execution terminal; and
    receiving an input for setting a change in the value of the reference attribute of the trigger object as a trigger for changing the display effect of the reaction object regardless of the user input methods.

11. The method of claim 1, wherein the change rule of the first chain reaction rule comprises a rule that makes nonlinear movement of makes the display effect of the reaction object on the prototype execution terminal in response to a change in the value of the reference attribute of the trigger object.

12. The method of claim 1, wherein the receiving of the third user settings for designating the trigger object, the reference attribute, the trigger range, the reaction object, and the change rule of the first chain reaction rule comprises receiving a pivot, a rotation angle, a rotation axis and a rotation direction required for a nonlinear movement of the reaction object, and the change rule of the first chain reaction rule comprises a rule that makes the reaction object rotate based on the received pivot, the received rotation angle, the received rotation axis and the received rotation direction on the prototype execution terminal in response to a change in the value of the reference attribute of the trigger object.

13. The method of claim 1, wherein the receiving of the third user settings for designating the trigger object, the reference attribute, the trigger range, the reaction object, and the change rule of the first chain reaction rule comprises receiving a movement path of the reaction object through the prototyping interface, and the change rule of the first chain reaction rule comprises a rule that makes the reaction object move along the received movement path on the prototype execution terminal in nonlinear response to a change in the value of the reference attribute of the trigger object.

14. The method of claim 1, wherein the automatically changing of the display effect of the reaction object according to the change rule of the first chain reaction rule by using the prototype execution terminal comprises, when a trigger set in the first chain reaction rule is a trigger for changing a display effect of at least one other object on the prototype execution terminal, changing the display effect of the at least one other object and, at the same time, changing the display effect of the reaction object according to the change rule of the first chain reaction rule by using the prototype execution terminal.

15. A prototyping terminal comprising:
    one or more processors;
    a memory which loads a computer program executed by the processors;
    a storage which stores a prototype generated by the execution of the computer program; and
    a display which displays a prototyping interface,
    wherein the computer program comprises:
       an operation of receiving, through a prototyping interface, a first user setting for designating a first user input on a first object for reacting a trigger object, a second user setting for designating a second user input on a second object for reacting the trigger object, and third user settings for designating the trigger object and a reference attribute of the trigger object, a trigger range of the first chain reaction rule, a reaction object, and a change rule of a first chain reaction rule, wherein the first chain reaction rule does not include information on the first user input and the second input;
       an operation of receiving, through the prototyping interface, a fourth user setting for setting a change in a value of the reference attribute of the trigger object within the trigger range of the first chain reaction rule, as a trigger for changing, when the first user input or the second user input is detected, a display effect of the reaction object; and
       an operation of receiving a selection of the reaction object and a change rule of the reaction object through the prototyping interface.

16. A computer program coupled to a computing device to execute a method for prototyping a graphic user interface (GUI) by a prototyping system and stored in a non-transitory computer readable recording medium, the program being configured to execute:
    an operation of receiving, through a prototyping terminal, a first user setting for designating a first user input on a first object for reacting a trigger object, a second user setting for designating a second user input on a second object for reacting the trigger object, and third user settings for designating the trigger object and a reference attribute of the trigger object, a trigger range of the first chain reaction rule, a reaction object, and a change rule of a first chain reaction rule through a prototyping interface, wherein the first chain reaction rule does not include information on the first user input and the second input;
    an operation of determining, through a prototyping execution terminal, when the first user input or the second user input is detected, whether a change in a value of the reference attribute of the trigger object is within the trigger range of the first chain reaction rule; and an operation of automatically changing, through the prototyping execution terminal, a display effect of the reaction object according to the change rule of the first chain reaction rule, in response to determining that the change in the value of the reference attribute of the trigger object is within the trigger range.

17. A system for prototyping a GUI, the system comprising:
    a prototyping terminal which receives a first user setting for designating a first user input on a first object for reacting a trigger object, a second user setting for designating a second user input on a second object for reacting the trigger object, and third user settings for designating the trigger object, a reference attribute of the trigger object, a trigger range of the first chain reaction rule, a reaction object, and a change rule of a first chain reaction rule through a prototyping interface, wherein the first chain reaction rule does not include information on the first user input and the second input; and
    a prototype execution terminal which determines, when the first user input or the second user input is detected, whether a change in a value of the reference attribute of the trigger object is within the trigger range of the first chain reaction rule, and automatically changes a display effect of the reaction object according to the change rule of the first chain reaction rule, in response to determining that the change in the value of the reference attribute of the trigger object is within the trigger range of the first chain reaction rule.

18. A method for prototyping a graphic user interface (GUI) by a prototyping system, the method comprising:
    receiving, by a prototyping terminal, a first chain reaction rule through a prototyping interface;
    sensing, by a prototype execution terminal, a change in a value of a reference attribute of a trigger object within a trigger range of the first chain reaction rule, wherein the reference attribute includes at least one selected from the group consisting of coordinates, size and color of the trigger object displayed on the GUI; and
    changing, by the prototype execution terminal, a display state of a reaction object according to a change rule of the first chain reaction rule when sensing the change in the value of the reference attribute of the trigger object, wherein the display state of the reaction object includes at least one selected from the group consisting of coordinates, size and color of the reacting object displayed on the GUI, wherein
    the first chain reaction rule includes the trigger range of the trigger object set as a trigger and the change rule of the reaction object, the trigger range indicates a range in which the value of the reference attribute of the trigger object is changed, and the change rule indicates a rule for changing the display state of the reaction object according the trigger,
    the trigger object includes a first trigger object and a second trigger object, and the first chain reaction rule includes a 1-1 chain reaction rule for the first trigger object and a 1-2 chain reaction rule for the second trigger object, and
    the changing the display state of the reaction object comprises:
        determining whether a first display effect of a first change rule of the 1-1 chain reaction rule and a second display effect of a second change rule of the 1-2 chain reaction rule can be displayed simultaneously, in combination; and
        changing the display state of the reaction object according to the combined first and second display effects, in response to the determining that the first display effect and the second display effect can be displayed simultaneously, in combination.

* * * * *